United States Patent
Jönsson

(12) 
(10) Patent No.: US 6,487,420 B1
(45) Date of Patent: Nov. 26, 2002

(54) ADAPTIVE RACH POWER DETERMINATION FOR MOBILE TELECOMMUNICATIONS USER EQUIPMENT UNIT

(75) Inventor: Erik Jönsson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/419,063

(22) Filed: Oct. 15, 1999

(51) Int. Cl.⁷ ................................................. H04Q 7/20
(52) U.S. Cl. ........................ 455/522; 455/69; 455/13.4
(58) Field of Search ............................... 455/69, 63, 70, 455/522, 127, 115, 126, 168, 432, 67.1, 525, 13.4; 375/130, 222, 224; 370/322, 323, 325

(56) References Cited

U.S. PATENT DOCUMENTS

| | | |
|---|---|---|
| 4,713,830 A | 12/1987 | McDonald |
| 5,179,723 A * | 1/1993 | Komoda ..................... 455/67.4 |
| 5,307,379 A | 4/1994 | Bergstrom et al. |
| 5,333,175 A | 7/1994 | Ariyavisitakul et al. |
| 5,426,641 A | 6/1995 | Afrashteh et al. |
| 5,487,180 A | 1/1996 | Ohtake |
| 5,548,834 A | 8/1996 | Suard et al. |
| 5,564,075 A | 10/1996 | Gourgue |
| 5,623,355 A | 4/1997 | Olsen |
| 5,634,195 A | 5/1997 | Sawyer |
| 5,697,053 A * | 12/1997 | Hanly .......................... 375/200 |
| 5,806,003 A * | 9/1998 | Jolma et al. .................. 370/337 |
| 5,822,682 A * | 10/1998 | Schroderus et al. .......... 455/63 |
| 5,844,940 A * | 12/1998 | Goodson et al. ............. 375/222 |
| 5,862,489 A | 1/1999 | Aalto |
| 5,960,333 A * | 9/1999 | Repke et al. .................. 455/91 |
| 6,002,942 A * | 12/1999 | Park ............................ 455/522 |
| 6,029,074 A * | 2/2000 | Irvin ........................... 455/571 |
| 6,035,209 A * | 3/2000 | Tiedemann, Jr. et al. ... 455/522 |
| 6,035,210 A * | 3/2000 | Endo et al. .................. 455/522 |
| 6,256,483 B1 * | 7/2001 | Moerder et al. ............. 455/115 |
| 6,308,080 B1 * | 10/2001 | Burt et al. ................... 455/522 |
| 6,341,225 B1 * | 1/2002 | Blanc .......................... 370/335 |
| 6,366,195 B1 * | 4/2002 | Harel et al. ................. 340/7.21 |

FOREIGN PATENT DOCUMENTS

| | | |
|---|---|---|
| EP | 0 913 957 A | 5/1999 |
| EP | 0 989 691 A | 3/2000 |
| WO | 97/07600 | 2/1997 |
| WO | 97/17769 | 5/1997 |

\* cited by examiner

*Primary Examiner*—Nay Maung
*Assistant Examiner*—Jean A Gelin
(74) *Attorney, Agent, or Firm*—Nixon & Vanderhye, P.C.

(57) ABSTRACT

A transmit power value ($P_{RACH}$) for a connection request message (RACH) from a mobile user equipment unit (20) to a telecommunications network (18) is determined using a target ratio of received energy to interference value $[(E_b/I_0)_{RACH\_target}]$ and a modification factor $[(E_b/I_0)_{MEAN\_DELTA}]$. The modification factor is a sliding mean differential between the target ratio and an actual ratio $[(E_b/I_0)_{ACTUAL}]$ of received energy to interference as determined by the telecommunications network. The modification factor allows for the calculation of the transmit power for the connection request message to be adaptive with respect to a changing characteristic of the mobile user equipment unit (e.g., aging of the mobile user equipment unit). In one embodiment, the transmit power value determination is made at the mobile user equipment unit.

44 Claims, 5 Drawing Sheets

ADAPTIVE RACH POWER DETERMINATION FOR MOBILE TELECOMMUNICATIONS USER EQUIPMENT UNIT

BACKGROUND

1. Field of the Invention

The present invention pertains to cellular telecommunications, and particularly to determining broadcast power to be used by a mobile user equipment unit when requesting access to a cellular telecommunications network.

2. Related Art and Other Considerations

Cellular telecommunications systems employ a wireless link (e.g., air interface) between the (mobile) user equipment and a base station (BS). The base station has transmitters and receivers for radio connections with numerous user equipment units. One or more base stations are connected (e.g., by landlines or microwave) and managed by a radio network controller (also known in some networks as a base station controller [BSC]). The radio network controller is, in turn, connected through control nodes to a core communications network. Control nodes can take various forms, depending on the types of services or networks to which the control nodes are connected. For connection to connection-oriented, switched circuit networks such as PSTN and/or ISDN, the control node can be a mobile switching center (MSC). For connecting to packet switching data services such as the Internet (for example), the control node can be a gateway data support node through which connection is made to the wired data networks, and perhaps one or more serving nodes.

When a mobile user equipment unit desires to initiate a connection with a base station, the user equipment unit typically sends a connection request message to the base station on a Random Access Channel (RACH). The RACH is a common channel that is available for all user equipment units within a geographical area or cell covered by the base station. The connection request message carried on the RACH generally includes various types of other information, such as (for example) signal strength of the received broadcast channel (so that the base station can calculate the transmission power to use) and some random number for (with probability) making the connection unique in the cell during the initial communication on the common channels (RACH and FACH). It is anticipated that the RACH may also be used for packet data in new telecommunications systems, such as wideband CDMA (WCDMA).

When a mobile user equipment unit sends its connection request message on the RACH, the user equipment unit must first calculate the transmit power that its transmitter will use for sending the connection request message. Preferably, in calculating the transmit power, the user equipment unit will use a transmission power which (hopefully) will be the lowest possible transmission power possible, thereby reducing interference for other users. But if the base station fails to receive the connection request message, the user equipment unit must repeat the transmission of its connection request until the base station successfully receives the connection request message, else the attempt to send the connection request is terminated as being unsuccessful.

According to a current technique, if the user equipment unit calculates too low a transmission power (thereby making it impossible for the base station to receive the connection request message), the user equipment unit increases its transmit output power for a successive connection requests (e.g., for each new connection request attempt). However, this current technique presents numerous problems.

A first set of problems can occur when the initially calculated transmit power for the connection request is too low. In such case, the power calculation for transmission of the next connection request, although increased, will probably also be too low. Moreover, the first connection request, sent at a transmit power too low to be received by the base station, can exacerbate the situation by increasing the interference for other user equipment units (perhaps causing them to increase their respective transmit powers) and consuming battery power in the requesting user equipment unit. Further, the delay in sending the next connection request message will likely be increased.

A second set of problems can occur when the initially calculated RACH transmit power is higher than necessary. In such case, the connection request message, sent at a greater-than-necessary power, increases interference for other users. In addition, the transmission of the connection request message consumes more power than necessary in the requesting user equipment unit.

A third set of problems involves aging of the user equipment unit. As a user equipment unit ages, under otherwise identical conditions the user equipment unit can require a different transmit power than when it was new due, e.g., to changing characteristics of the transmitter and/or receiver components. As a result, the user equipment unit will likely use too high or too low a transmit power for its first connection request.

Prior art RACH power determination techniques are discussed in the patent literature. See, for example, U.S. Pat. No. 5,806,003 to Jolma et al.; U.S. Pat. No. 5,487,180 to Ohtake; and U.S. Pat. No. 5,333,175 to Ariyavisitakul et al.

What is needed, therefore, and an object of the present invention, is a technique which is adaptive for changing characteristics of the mobile user equipment unit for determining transmit power when making a connection request.

BRIEF SUMMARY OF THE INVENTION

A transmit power value ($P_{RACH}$) for a connection request message (RACH) from a mobile user equipment unit to a telecommunications network is determined using a target ratio of received energy to interference value $[(E_b/I_0)_{RACH\_target}]$ and a modification factor $[(E_b/I_0)_{MEAN\_DELTA}]$. The modification factor is a sliding mean differential between the target ratio and an actual ratio $[(E_b/I_0)_{ACTUAL}]$ of received energy to interference as determined by the telecommunications network. The modification factor allows for the calculation of the transmit power for the connection request message to be adaptive with respect to a changing characteristic of the mobile user equipment unit (e.g., aging of the mobile user equipment unit).

The modification factor is obtained by taking a mean of a set of differentials $[(E_b/I_0)_{DELTA}]$. Each differential of the set is a difference between the target ratio and the actual ratio. Plural differentials of the set are compiled with respect to a corresponding plural number of previous connection request messages. Preferably the set of differentials are stored in a FIFO, so that a sliding mean of the plural (n) differential values maintained in the FIFO can be determined and used as the modification factor $[(E_b/I_0)_{MEAN\_DELTA}]$.

Determining the transmit power value for the connection request message comprises evaluating the expression $P_{RACH} = C_{RACH} + (E_b/I_0)_{ADAPTED\ TARGET} + I_{UL} + P_{perch\_sent} - P_{perch\_meas}$, wherein $P_{RACH}$ is transmit power for the connection request message calculated by the on-board unit; $C_{RACH}$ is a constant depending on rate, channel coding, and carrier bandwidth; $I_{UL}$ is uplink interference determined at the telecommunications network; $P_{perch\_sent}$ is downlink output power used for a broadcast channel; $P_{perch\_meas}$ is received broadcast channel power measured at the user equipment unit; $(E_b/I_0)_{ADAPTED\ TARGET}$ is an adaptive target $E_b/I_0$ for the connection request message.

The value $(E_b/I_0)_{ADAPTED\ TARGET}$ is determined using the target energy to power ratio $(E_b/I_0)_{RACH\_target}$ as specified by the telecommunications network and the modification factor. The uplink interference $(I_{UL})$, downlink output power for the broadcast channel $(P_{perch\_sent})$, and target energy to power ratio $[(E_b/I_0)_{RACH\_target}]$ are transmitted to the mobile user equipment unit in a broadcast channel message. After the mobile user equipment unit successfully completes the connection request message, the telecommunications network sends a access grant message which includes an actual ratio of received energy to interference $[(E_b/I_0)_{ACTUAL}]$ determined by the network for use as a latest differential affecting the modification factor for the next connection request message from the mobile user equipment unit.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
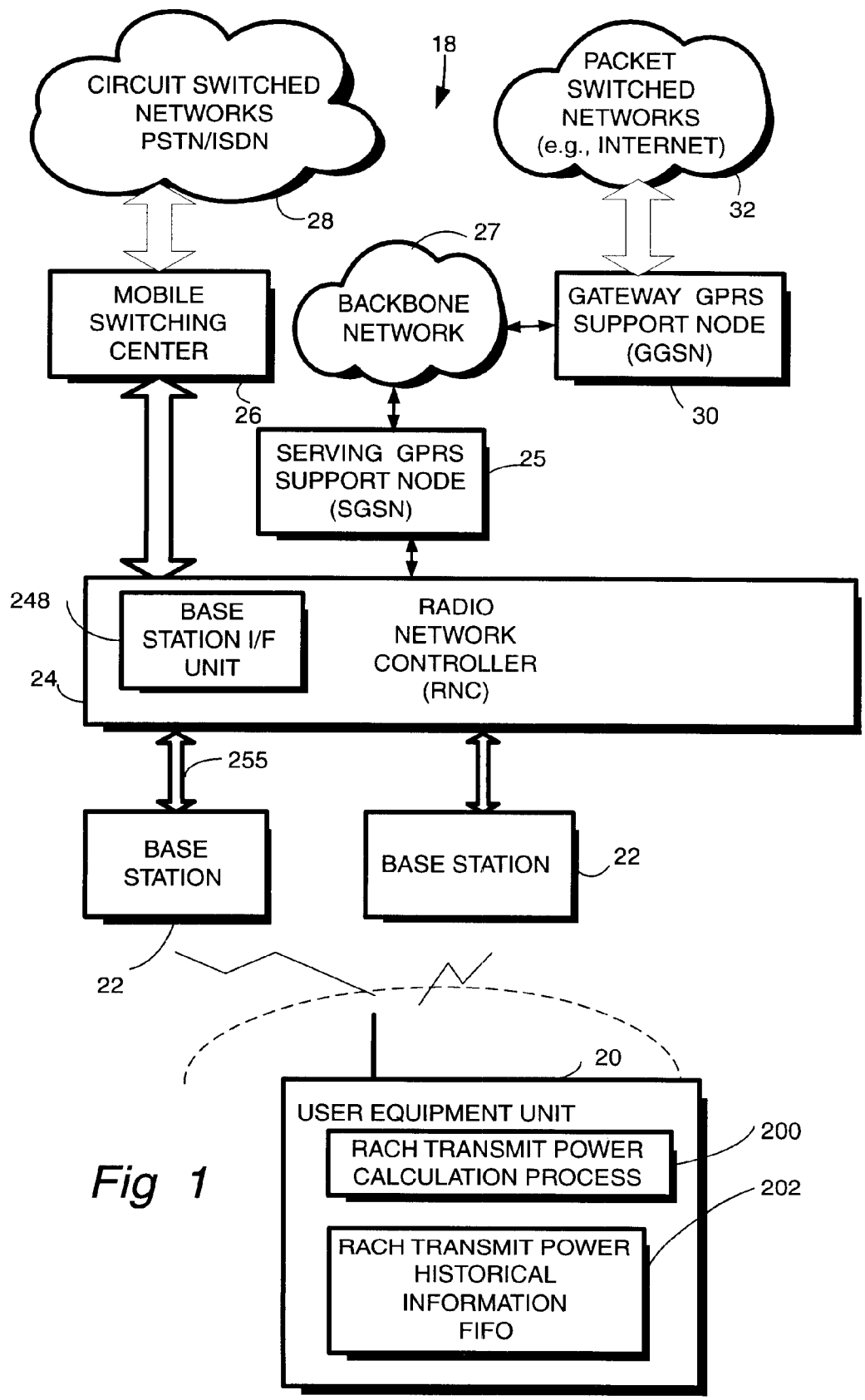
FIG. 1 is a schematic view of an embodiment of a telecommunications system which utilizes the present invention.

FIG. 1 shows a telecommunications network 18 in which a user equipment unit 20 communicates with one or more base stations 22 over air interface (e.g., radio interface) 23. Base stations 22 are connected by terrestrial lines (or microwave) to radio network controller (RNC) 24 [also known as a base station controller (BSC) in some networks]. The radio network controller (RNC) 24 is, in turn, connected through a control node known as the mobile switching center 26 to circuit-switched telephone networks (PSTN/ISDN) represented by cloud 28. In addition, radio network controller (RNC) 24 is connected to Serving GPRS Support Node (SGSN) 25 and through backbone network 27 to a Gateway GRPS support node (GGSN) 30, through which connection is made with packet-switched networks (e.g., the Internet, X.25 external networks) represented by cloud 32.

As understood by those skilled in the art, when user equipment unit 20 participates in a mobile telephonic connection, signaling information and user information from user equipment unit 20 are transmitted over air interface 23 on designated radio channels to one or more of the base stations 22. The base stations have radio transceivers which transmit and receive radio signals involved in the connection or session. For information on the uplink from the user equipment unit 20 toward the other party involved in the connection, the base stations convert the radio-acquired information to digital signals which are forwarded to radio network controller (RNC) 24. The radio network controller (RNC) 24 orchestrates participation of the plural base stations 22 which may be involved in the connection or session, since user equipment unit 20 may be geographically moving and handover may be occurring relative to the base stations 22. On the uplink, radio network controller (RNC) 24 picks frames of user information from one or more base stations 22 to yield a connection between user equipment unit 20 and the other party, whether that party be in PSTN/IDSN 28 or on the packet-switched networks (e.g., the Internet) 32.

Figure 2:
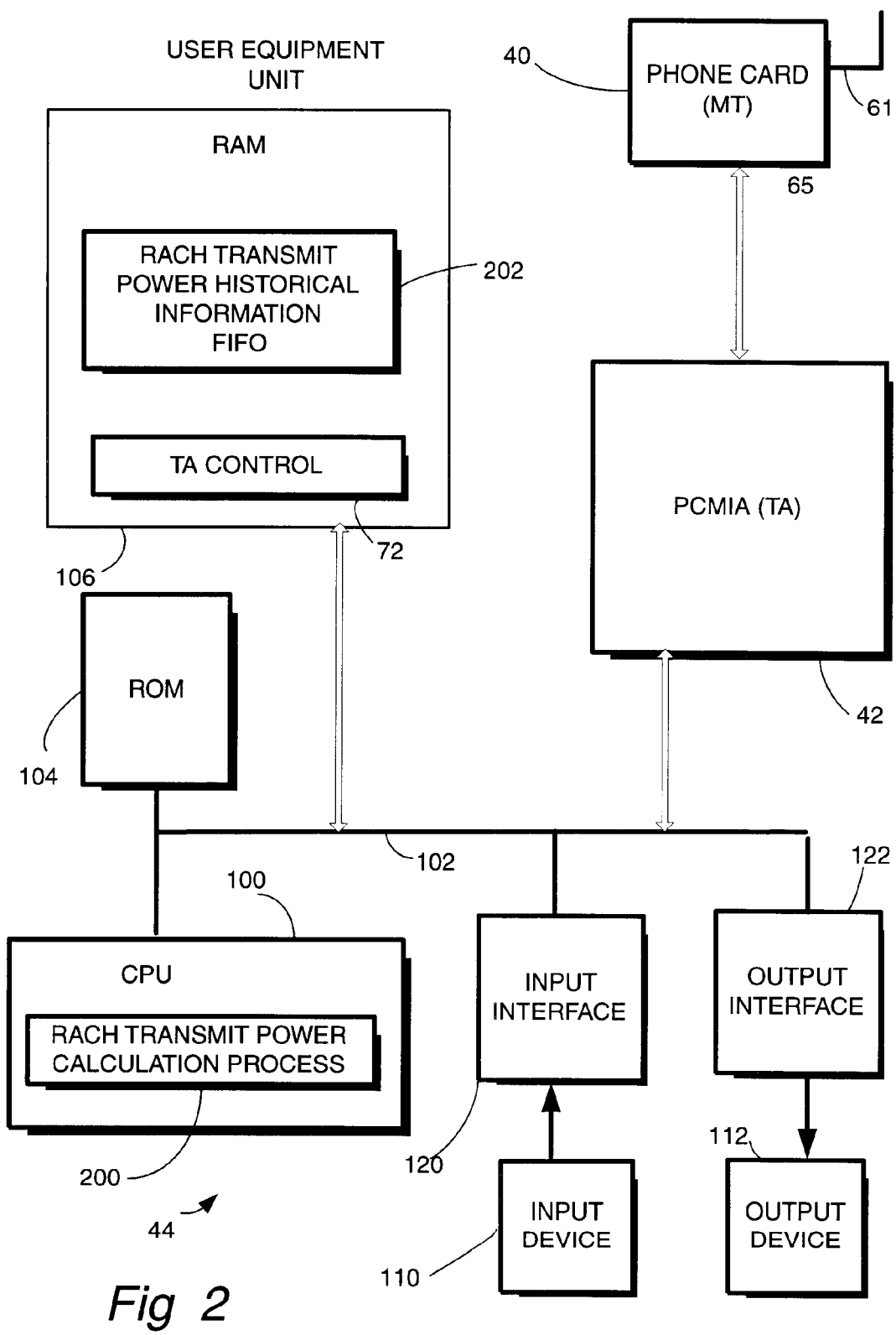
FIG. 2 is a diagrammatic view of a mobile user equipment unit which participates in the telecommunications system of FIG. 1.

An illustrative embodiment of a suitable user equipment unit 20 for the present invention is provided in FIG. 2. As shown in FIG. 2, user equipment unit 20 has the mobile termination entity (MT) 40; terminal adapter (TA) 42; and terminal equipment (TE) 44, each of which is discussed briefly hereafter.

Mobile termination entity (MT) 40, which is sometimes called the Mobile Equipment (ME), contains the radio transmitter/receiver (with antenna 61) and communications control toward the network, e.g., the setup and release of radio connections, handover, etc. Mobile termination entity (MT) 40 can be a standard mobile pocket telephone (e.g., a GSM phone) or a phone card within user equipment unit 20.

Terminal adapter (TA) 42 acts as an adaptation between mobile termination entity (MT) 40 and a set of applications executed by the terminal equipment. The terminal adapter (TA) 42 is typically realized as a Modem implemented on a PCMCIA (Personal Computer Memory Card International Association) card, which is inserted in a slot of terminal equipment 44.

Terminal equipment 44 is normally a small computer (or computer platform), and as such includes both hardware and software. Terminal equipment 44 thus has typical aspects of a computer platform, e.g., a processor with operating system and middleware (Internet protocol suits, for example). In addition, terminal equipment 44 has control logic 72 (executed by the processor) for controlling terminal adapter (TA) 42. Control logic 72 performs set-up and release of calls to and from the network 18. In essence, FIG. 2 shows terminal equipment 44 wherein mobile termination entity (MT) 40 and terminal adapter (TA) 42 are cards situated in card slots. Terminal adapter (TA) 42 is connected to central processing unit (CPU) 100 by bus 102. Mobile termination entity (MT) is connected to MT interface 65 of terminal adapter (TA) 42 by a cable. Memories of terminal equipment 44, particularly read only memory (ROM) 104 and random access memory (RAM) 106 are also connected to central processing unit (CPU) 100 by bus 102. Terminal equipment 44 interfaces with a user through input device(s) 110 and output device(s) 112, each connected through respective appropriate interfaces 120 and 122 to bus 102. Input device(s) 110 can be a keyboard and/or mouse, for example, while output device(s) 112 can take the form of a display device, such as a LCD display panel, for example.

It should be understood that the invention is not confined to user equipment units having the same physical separation between functional entities as shown in FIG. 2, and that the present invention can be implemented in other than the described functional/structural configuration.

Figure 3:
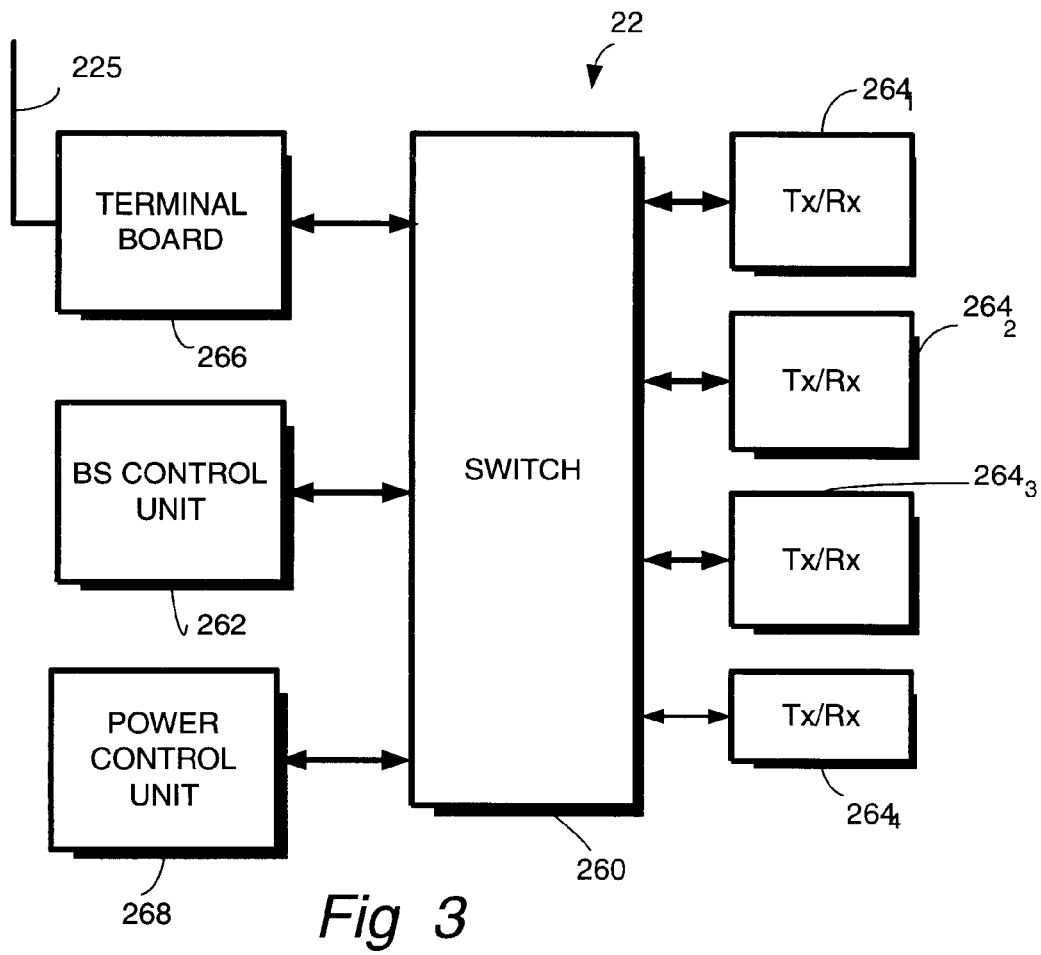
FIG. 3 is a schematic view of an example base station node according to an embodiment of the invention.

An example base station (BS) 22 is shown in FIG. 3 as comprising a switch 260. Switch 260, which is controlled by base station control unit 262, has a plurality of ports. At least one, and typically several, of the ports of switch 260 are connected to respective transceiver (Tx/Rx) boards 264. Transceiver (Tx/Rx) boards 264 are connected to antennae which are located in the cell served by the base station (BS) 22. Control unit 262 is also connected to ports of switch 260, as are a terminal board 266 and a power control unit 268. It is through terminal board 266 that base station (BS) 22 communications with its radio network controller (RNC) 24, with link 225 being connected between an appropriate base station interface unit 248 of the radio network controller (RNC) 24 (see FIG. 1 and FIG. 3) and terminal board 266. Power control unit 268 performs numerous functions, including determining a signal-to-noise ratio (SNR) and quality of connection (QOC) parameter for a received signal from each user equipment unit 20 with which base station 22 is in communication and sending a power change command when necessary to the user equipment units 20 for which it is responsible. These and other functions performed by power control unit 268 concerning established connections are understood with reference, e.g., to U.S. patent application Ser. No. 08/916,440, entitled "Signaling Method for CDMA Quality Based Power Control", which is incorporated herein by reference. In addition, power control unit 268 sets the downlink power level at which base station 22 is to transmit its broadcast channel message, e.g., $P_{perch\_sent}$. If desired, the functions of power control unit 268 can be consolidated in a single unit with BS control unit 262.

In accordance with the present invention, the user equipment unit 20 has an on-board unit which makes a calculation of a transmit power to be used for a connection request message to telecommunications network 18. Advantageously, the calculation of the transmit power is adaptive with respect to a changing characteristic of the user equipment unit 20, i.e., age of the user equipment unit 20.

In the above regard, the CPU 100 of user equipment unit 20 executes a RACH transmit power calculation process 200 (see FIG. 2). The RACH transmit power calculation process 200 is a set of coded instructions which can be stored in a memory (e.g., ROM 104) and loaded into CPU 100 for execution. In execution RACH transmit power calculation process 200, the CPU 100 utilizes transmit power historical information stored in a portion of RAM 106 depicted as RACH transmit power historical information FIFO 202 (see FIG. 2). RAM 106 must be of a non-volatile type which maintains the data stored therein even when the user equipment unit 20 is turned off.

The RACH transmit power calculation process 200 assumes that various parameters are made available from telecommunications network 18. In this regard, it is required that RACH transmit power calculation process 200 be advised by telecommunications network 18 of (1) the uplink interference $I_{UL}$ experienced by the telecommunications network 18; and (2) the downlink output power $P_{perch\_sent}$ which is used for a broadcast channel. In addition, RACH transmit power calculation process 200 assumes the user equipment unit 20 can measure the broadcast channel power $P_{perch\_meas}$ which user equipment unit 20 receives. Each of these three values—$I_{UL}$; $P_{perch\_sent}$; and $P_{perch\_meas}$ are stored in an appropriate memory for use by RACH transmit power calculation process 200, e.g., stored in RAM 106.

Figure 4:
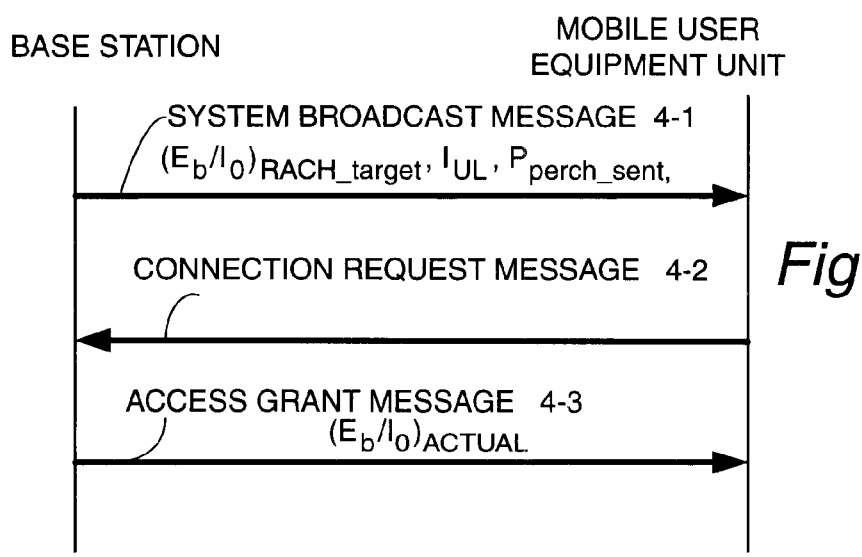
FIG. 4 is a diagrammatic view showing a sequence of messages transmitted between a telecommunications network and a user equipment unit germane to a RACH transmit power calculation process of the present invention.

FIG. 4 shows a selected sequence of messages, germane to RACH transmit power calculation process 200, which occurs in telecommunications network 18. FIG. 4 shows as message 4-1 a broadcast channel message which is transmitted, preferably over a common channel such as BCCH, to user equipment unit 20. Although FIG. 4 shows only one such broadcast channel message 4-1, it should be understood that such messages are typically periodically transmitted, such that an entire series of broadcast channel messages 4-1 could, in fact, be illustrated. The broadcast channel message 4-1 can include numerous fields of information, in a manner known in the prior art, but for the purpose of the present invention includes, e.g., fields for the uplink interference $I_{UL}$ experienced by the telecommunications network 18, the downlink output power $P_{perch\_sent}$ which is used for the broadcast channel message 4-1, and the target RACH transmit power $(E_b/I_0)_{RACH\_target}$ that telecommunications network 18 prefers for mobile user equipment unit 20 to utilize when sending a connection request message.

The broadcast channel message 4-1 shown in FIG. 4 emanates from base station 22 of telecommunications network 18, and in particular is prepared and formatted by BS control unit 262. However, base station 22 obtains values for the parameters uplink interference $I_{UL}$ experienced by the telecommunications network 18 and the downlink output power $P_{perch\_sent}$ from power control unit 268. The base station 22 knows at what values it sets its downlink output power $P_{perch\_sent}$ for the broadcast channel message 4-1, and determines the value for the uplink interference $I_{UL}$ as the sum of all interference measured on one frequency in one cell (which includes all uplink radio beams and additional noise).

Figure 5:
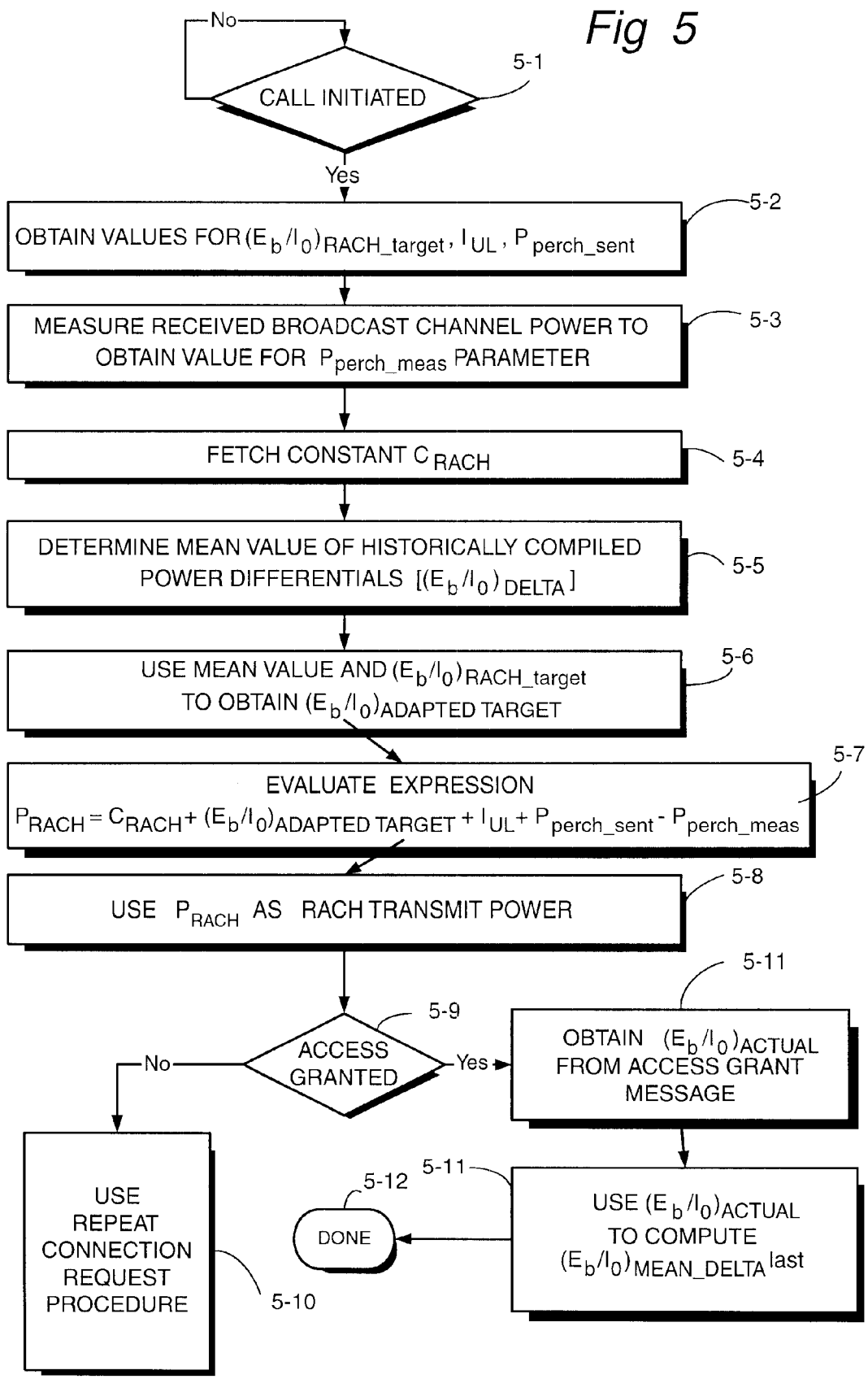
FIG. 5 is a flowchart showing basic steps involved in a RACH transmit power calculation process of the present invention.

FIG. 5 shows basic steps involved in the RACH transmit power calculation process 200 of the present invention. The RACH transmit power calculation process 200 is performed in order to determine a transmit power $P_{RACH}$ to be used for transmitting the connection request message to be sent by mobile user equipment unit 20. The connection request message is illustrated as message 4-2 in FIG. 4.

Step 5-1 shows RACH transmit power calculation process 200 checking whether the user of mobile user equipment unit 20 has indicated a desire to initiate a call. If it is determined at step 5-1 that a call is to be placed from mobile user equipment unit 20, at step 5-2 the RACH transmit power calculation process 200 fetches from memory the values stored for the parameters $P_{perch\_sent}$ (downlink output power of the broadcast channel message 4-1 as ascertained from the broadcast channel message 4-1); $I_{UL}$ (uplink interference at the base station 22 as specified in the broadcast channel message 4-1); and target RACH transmit power $(E_b/I_0)_{RACH\_target}$.

At step 5-3 RACH transmit power calculation process 200 measures the received power of the broadcast channel message 4-1 to obtain a value for $P_{perch\_meas}$. Thus, $P_{perch\_meas}$ is received broadcast channel power measured at the user equipment unit 20.

At step 5-4 the RACH transmit power calculation process 200 fetches a constant value $C_{RACH}$ from memory. The parameter $C_{RACH}$ is a constant depending on rate, channel coding, and carrier bandwidth. In general, the parameter $C_{RACH}$ is a relation between signal interference level and $E_b/I_0$. In particular, in one illustrative embodiment of the invention, the parameter $C_{RACH}$ is determined by the following expression:

$$C_{RACH} = 2 \text{ dB} + CR \text{ dB} - CB \text{ dB} + SR \text{ dB}$$

wherein CR is coding rate; CB is carrier bandwidth; SR is symbol rate. In one example, CR=½ (=−3.01 dB); SR is 16 ksps (=42.04 dB); BW is 4.096 Mcps (=66.12 dB); which gives $C_{RACH}$=−25.1 dB.

Figure 6:
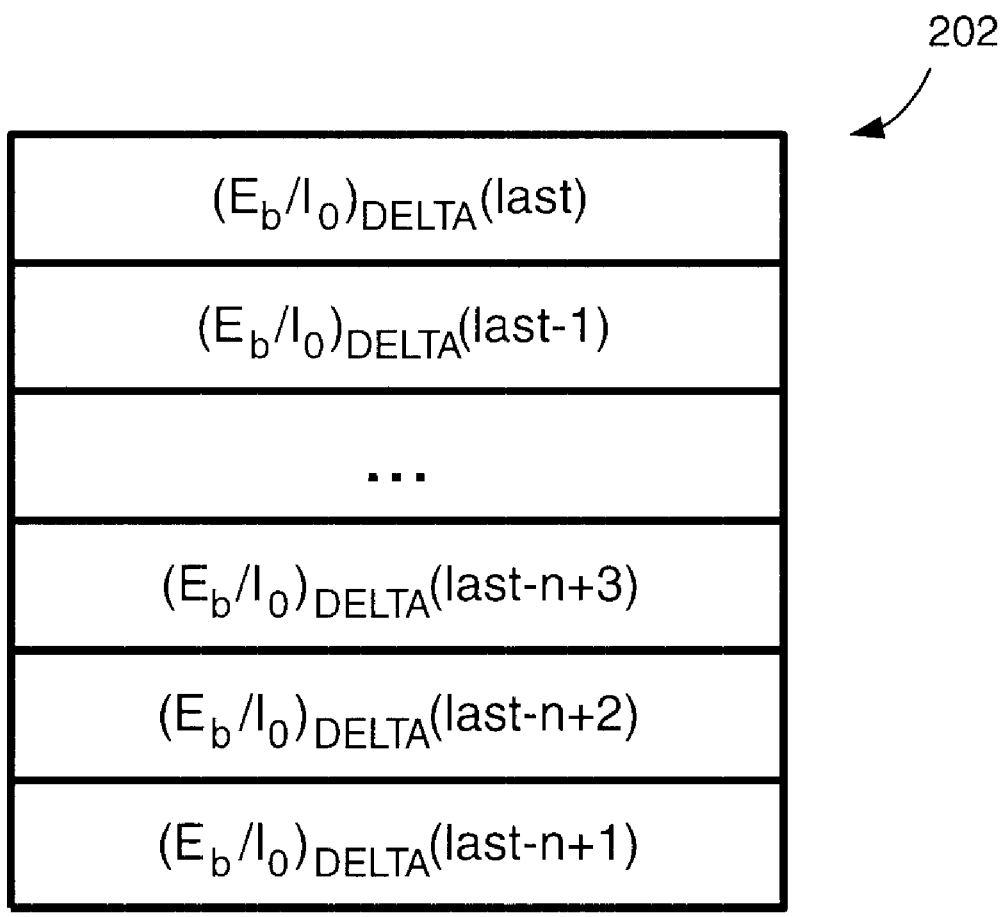
FIG. 6 is a diagrammatic view of a RACH transmit power historical information FIFO.

At step 5-5 the RACH transmit power calculation process 200 determines a modification factor. The modification factor is a mean value of RACH power differentials historically compiled in FIFO 202 (see FIG. 2). In this regard, and as illustrated in FIG. 6, RACH transmit power historical information FIFO 202 includes a first-in, first-out set of n memory locations for storing historically gathered values of a parameter $(E_b/I_0)_{DELTA}$. As explained below, the n samples of the parameter $(E_b/I_0)_{DELTA}$ were obtained upon occasion of the n number of previous successful RACH messages sent from mobile user equipment unit 20. Those skilled in the art will recognize the ratio $(E_b/I_0)$ as being the ratio of energy to interference as determined by the telecommunications network.

As illustrated in FIG. 6, the first value in RACH transmit power historical information FIFO 202, i.e., $(E_b/I_0)_{DELTA}$ (last), was stored upon the immediately previous successful transmission of a connection request (RACH) message. The second value $[(E_b/I_0)_{DELTA}(\text{last}-1)]$ was stored upon the next older (i.e., penultimate) successful transmission of a connection request (RACH) message; and so forth to the last value $[(E_b/I_0)_{DELTA}(\text{last}-n+1)]$. Each of the values in RACH transmit power historical information FIFO 202, generically referred to as $(E_b/I_0)_{DELTA}$, is computed to be a difference between the value $(E_b/I_0)_{RACH\_target}$ (obtained from broadcast channel message 4-1 as depicted at step 5-1) and a value $(E_b/I_0)_{ACTUAL}$. As explained below, after a successful connection request message 4-2 is sent, an access grant message is received. An example access grant message is illustrated as message 4-3 in FIG. 4. The access grant message 4-3 includes a value for $(E_b/I_0)_{ACTUAL}$ with respect to the RACH message which prompted the access grant message 4-3. The value for $(E_b/I_0)_{ACTUAL}$ is the actual ratio of received energy to interference as determined by the telecommunications network, and particularly as determined by power control unit 268 of base station 22. Then, after a successful connection request message 4-2, a new $(E_b/I_0)_{DELTA}$(last) is calculated as the difference between the value $(E_b/I_0)_{RACH\_target}$ and the value $(E_b/I_0)_{ACTUAL}$ received in the corresponding access grant message 4-3 (see step 5-12).

Thus, at step 5-5 a mean of the values $(E_b/I_0)_{DELTA}$(last) through $(E_b/I_0)_{DELTA}$(last−n+1) is computed. In particular, at step 5-5 the RACH transmit power calculation process 200 determines $(E_b/I_0)_{MEAN\_DELTA}$ as the mean of all values stored in RACH transmit power historical information FIFO 202. It is this $(E_b/I_0)_{MEAN\_DELTA}$ which is herein referred to as a modification factor, or historical-based modification factor.

Step 5-6 involves RACH transmit power calculation process 200 determining a value for a parameter $(E_b/I_0)_{ADAPTED\ TARGET}$. The parameter $(E_b/I_0)_{ADAPTED\ TARGET}$ is the sum of the value $(E_b/I_0)_{RACH\_target}$ (obtained from the broadcast channel message 4-1 and fetched at step 5-1) and the modification factor, i.e., the value $(E_b/I_0)_{MEAN\_DELTA}$ (as determined at step 5-5). Then, at step 5-7 the RACH transmit power calculation process 200 uses the calculated value for the parameter $(E_b/I_0)_{ADAPTED\ TARGET}$ to evaluate the following expression for $P_{RACH}$:

$$P_{RACH} = C_{RACH} + (E_b/I_0)_{ADAPTED\ TARGET} + I_{UL} + P_{perch\_sent} - P_{perch\_meas}.$$

As explained above, $C_{RACH}$ is a constant depending on rate, channel coding, and carrier bandwidth (see step 5-4); $I_{UL}$ is uplink interference determined at the telecommunications network (see step 5-2); $P_{perch\_sent}$ is downlink output power used for a broadcast channel (see step 5-2); and, $(E_b/I_0)_{ADAPTED\ TARGET}$ is the adaptive target $E_b/I_0$ for the connection request message (see step 5-6).

At step 5-8 the RACH transmit power calculation process 200 uses the value of $P_{RACH}$ as calculated at step 5-8 as the transmit power for transmitting the connection request message 4-2 (see FIG. 4). If the amount of power computed at step 5-7 and utilized at step 5-8 proves adequate, an access granted message 4-3 is received by mobile user equipment unit 20. Therefore, after an appropriate time window has elapsed subsequent to the attempted transmission of a connection request message 4-2 at step 58, at step 5-9 a check is made by mobile user equipment unit 20 to determine if it has received an access grant message 4-3. If it is determined at step 5-9 that an access grant message 4-3 has not been timely received, at step 5-10 the RACH transmit power calculation process 200 enters a repeat connection request procedure. The details of the repeat connection request procedure of step 5-10 are not pertinent to the present invention, and can involve any appropriate repeat technique including increasing the power amount by a predetermined factor.

Assuming that an access grant message 4-3 is received and so determined at step 5-9, at step 5-11 the RACH transmit power calculation process 200 obtains the value $(E_b/I_0)_{ACTUAL}$ from the access grant message 4-3. The value $(E_b/I_0)_{ACTUAL}$ included in the access grant message 4-3 received at step 5-9 reflects the actual $(E_b/I_0)$ as measured by base station 22 at the time the base station 22 receives the connection request message 4-2 of step 5-8. Then, having obtained the $(E_b/I_0)_{ACTUAL}$, at step 5-11 the RACH transmit power calculation process 200 determines a new $(E_b/I_0)_{DELTA}$ with respect to the connection request message 4-2 of step 5-8 by finding the difference between the $(E_b/I_0)_{ACTUAL}$ obtained at step 5-11 and the value $(E_b/I_0)_{RACH\_target}$, and uses the new $(E_b/I_0)_{DELTA}$ as the $(E_b/I_0)_{DELTA}$(last) in RACH transmit power historical information FIFO 202. The former value $(E_b/I_0)_{DELTA}$(last) then becomes $(E_b/I_0)_{DELTA}$(last−1), and so forth, with the oldest value of $(E_b/I_0)_{DELTA}$ in RACH transmit power historical information FIFO 202 rolling out of the window maintained by RACH transmit power historical information FIFO 202. Such FIFO storing techniques, including the user of a pointer to point to the memory location to be occupied by the next entry (e.g., the "$(E_b/I_0)_{DELTA}$(last)"), are well understood by those skilled in the art.

Thus, upon successful completion of a connection request message 4-2 and storing in RACH transmit power historical information FIFO 202 of a new $(E_b/I_0)_{DELTA}$(last) with respect thereto, the RACH transmit power calculation process 200 is concluded as indicated by step 5-12.

The equation of step 5-7 is thus adaptive and compensates for poorly tuned equipment in mobile user equipment unit 20. Advantageously, when the RACH transmit power calculation process 200 of the present invention increases transmit power for a connection request message 4-2 upon failure of a base station 22 to receive the same, the power increase is performed in more gradual fashion than in currently prevailing techniques. This is due, at least in part, to the ability of the mobile user equipment unit 20 to take into account that the first calculated transmit power is better, closer to the correct value, with the adaptive tuning of the invention than without. Therefore, the power ramping is less aggressive. Without the present invention, the power ramping must be aggressive for guaranteeing that a RACH is sent with sufficient transmit power which is higher, or equal to, the correct value without too many retransmissions.

In view of the present invention, e.g., the use of the equation of step 5-7, the RACH power calculation of mobile user equipment unit 20 is adaptively changed over the life of mobile user equipment unit 20. In view of the adaptive change, the RACH power level as initially calculated at step 5-7 and utilized at step 5-8 is probably correct. In view of such initial accuracy, there is generally no need to have as aggressive power ramping than otherwise, and therefore less risk of increasing the RACH transmit power to a higher than necessary amount. Moreover, the delay for sending connection request messages 4-2 is decreased in view of the initial accuracy, particularly by comparison to a badly tuned mobile user equipment unit 20 that does not employ the advantageous adaptive calculation features of the present invention.

Thus, the foregoing example has illustrated a sliding mean value technique for achieving adaptability of RACH transmit power. The sliding aspect of the technique is attributed, e.g., to the first-in, first-out aspects of RACH transmit power historical information FIFO 202. Utilization of the mean value serves as a time averaging of most recently acquired $(E_b/I_0)_{DELTA}$ values. It should be understood that other techniques for achieving historical adaptivity of RACH transmit power for mobile user equipment unit 20 can be utilized, such as taking a type of average other than a mean average.

While in the foregoing example various stored parameters have been accorded to certain memories, e.g., RAM 106, it should be understood other choices of storage locations can be utilized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mobile user equipment unit having an on-board unit which makes a calculation of a transmit power for a connection request message to a telecommunications network by evaluating the expression:

$$P_{RACH}=C_{RACH}+(E_b/I_0)_{ADAPTED\ TARGET}+I_{UL}+P_{perch\_sent}-P_{perch\_meas}$$

wherein
$P_{RACH}$ is transmit power for the connection request message calculated by the on-board unit;
$C_{RACH}$ is a constant depending on rate, channel coding, and carrier bandwidth;
$I_{UL}$ is uplink interference determined at the telecommunications network;
$P_{perch\_sent}$ is downlink output power used for a broadcast channel;
$P_{perch\_meas}$ is received broadcast channel power measured at the user equipment unit;
$(E_b/I_0)_{ADAPTED\ TARGET}$ is an adaptive target $E_b/I_0$ for the connection request message.

2. The apparatus of claim 1, wherein $(E_b/I_0)_{ADAPTED\ TARGET}$ is computed using a target transmit power specified by the telecommunications network and a modification factor.

3. The apparatus of claim 2, wherein the modification factor is maintained by the mobile user equipment unit.

4. The apparatus of claim 3, wherein the modification factor is a mean of a set of differentials, each differential of the set being a difference between a target ratio of received energy to interference and an actual ratio of received energy to interference as determined by the telecommunications network.

5. The apparatus of claim 4, wherein the set of differentials are compiled with respect to a plural number of previous connection request messages.

6. The apparatus of claim 4, wherein at least one of the target ratio of received energy to interference and the actual ratio of received energy to interference as determined by the telecommunications network is transmitted from the telecommunications network to the user equipment unit.

7. The apparatus of claim 4, wherein both the target ratio of received energy to interference and the actual ratio of received energy to interference as determined by the telecommunications network is transmitted from the telecommunications network to the user equipment unit.

8. The apparatus of claim 6, wherein the actual ratio of received energy to interference as determined by the telecommunications network is transmitted from the telecommunications network to the user equipment unit in an access grant message.

9. The apparatus of claim 6, wherein the target ratio of received energy to interference as determined by the telecommunications network is transmitted from the telecommunications network to the user equipment unit in broadcast channel message.

10. The apparatus of claim 9, wherein the on-board unit is a processor which executes a set of coded instructions stored in a memory, and wherein execution of the set of coded instructions includes the evaluation of the expression.

11. A method of operating a mobile user equipment unit which transmits a connection request message to a telecommunications network, the method comprising:
obtaining a target ratio of received energy to interference value;
determining a transmit power value for the connection request message using the target ratio of received energy to interference value and a modification factor, the modification factor being a differential between the target ratio of received energy to interference and an actual ratio of received energy to interference as determined by the telecommunications network.

12. The method of claim 11, further comprising determining the modification factor at the mobile user equipment unit.

13. The method of claim 11, further comprising determining the modification factor by taking a mean of a set of differentials, each differential of the set being a difference between a target ratio of received energy to interference and an actual ratio of received energy to interference as determined by the telecommunications network.

14. The method of claim 13, further comprising compiling plural differentials of the set with respect to a corresponding plural number of previous connection request messages.

15. The method of claim 11, wherein the step of determining a transmit power value for the connection request message comprises evaluating the expression:

$$P_{RACH}=C_{RACH}+(E_b/I_0)_{ADAPTED\ TARGET}+I_{UL}+P_{perch\_sent}-P_{perch\_meas}$$

wherein
  $P_{RACH}$ is transmit power for the connection request message calculated by the on-board unit;
  $C_{RACH}$ is a constant depending on rate, channel coding, and carrier bandwidth;
  $I_{UL}$ is uplink interference determined at the telecommunications network;
  $P_{perch\_sent}$ is downlink output power used for a broadcast channel;
  $P_{perch\_meas}$ is received broadcast channel power measured at the user equipment unit;
  $(E_b/I_0)_{ADAPTED\ TARGET}$ is an adaptive target $E_b/I_0$ for the connection request message.

16. The method of claim 15, further comprising determining $(E_b/I_0)_{ADAPTED\ TARGET}$ using a target energy to power ratio $(E_b/I_0)_{RACH\_target}$ as specified by the telecommunications network and the modification factor.

17. The method of claim 16, further comprising determining the modification factor at the mobile user equipment unit.

18. The method of claim 17, further comprising deriving the modification factor as a mean of a set of differentials, each differential of the set being a difference between a target ratio of received energy to interference and an actual ratio of received energy to interference as determined by the telecommunications network.

19. The method of claim 18, further comprising compiling plural differentials of the set with respect to a corresponding plural number of previous connection request messages.

20. The method of claim 11, further comprising determining a transmit power value for the connection request message at the mobile user equipment unit.

21. A mobile user equipment unit which has an on-board unit which makes a calculation of a transmit power for a connection request message to a telecommunications network, wherein the on-board unit makes the calculation of the transmit power using a target ratio of received energy to interference value and a modification factor, the modification factor being a differential between the target ratio of received energy to interference and an actual ratio of received energy to interference as determined by the telecommunications network.

22. The apparatus of claim 21, wherein the modification factor is a mean of a set of differentials, each differential of the set being a difference between a target ratio of received energy to interference and an actual ratio of received energy to interference as determined by the telecommunications network.

23. The apparatus of claim 22, wherein the set of differentials are compiled with respect to a plural number of previous connection request messages.

24. The apparatus of claim 21, wherein the user equipment unit includes a memory which stores transmit power historical information for the user equipment unit, and wherein the on-board unit uses the transmit power historical information in making the calculation of the transmit power to be used in making a connection request message to a telecommunications network.

25. The apparatus of claim 24, wherein the memory stores a set of historically compiled differentials, each of the differentials being a difference between a target ratio of received energy to interference and an actual ratio of received energy to interference as determined by the telecommunications network.

26. The apparatus of claim 25, wherein the memory is a FIFO register, and wherein the on-board unit uses a mean value of the historically compiled differentials stored in the FIFO register in making the calculation of the transmit power to be used in making the connection request message to a telecommunications network.

27. The apparatus of claim 26, wherein at least one of the target ratio of received energy to interference and the actual ratio of received energy to interference as determined by the telecommunications network is transmitted from the telecommunications network to the user equipment unit.

28. The apparatus of claim 26, wherein both the target ratio of received energy to interference and the actual ratio of received energy to interference as determined by the telecommunications network is transmitted from the telecommunications network to the user equipment unit.

29. The apparatus of claim 28, wherein the actual ratio of received energy to interference as determined by the telecommunications network is transmitted from the telecommunications network to the user equipment unit in an access grant message.

30. A method of operating a mobile user equipment unit which transmits a connection request message to a telecommunications network, the method characterized by:
  obtaining an actual ratio of received energy to interference as determined by the telecommunications network;
  obtaining a target ratio of received energy to interference value;
  determining a transmit power value for the connection request message using the target ratio of received energy to interference value and a modification factor, the modification factor being a differential between the target ratio of received energy to interference and the actual ratio of received energy to interference as determined by the telecommunications network.

31. The method of claim 30, further comprising determining the modification factor at the mobile user equipment unit.

32. The method of claim 30, further comprising determining the modification factor by taking a mean of a set of differentials, each differential of the set being a difference between a target ratio of received energy to interference and an actual ratio of received energy to interference as determined by the telecommunications network.

33. The method of claim 32, further comprising compiling plural differentials of the set with respect to a corresponding plural number of previous connection request messages.

34. The method of claim 30, wherein the step of determining a transmit power value for the connection request message comprises evaluating the expression:

$$P_{RACH}=C_{RACH}+(E_b/I_0)_{ADAPTED\ TARGET}+I_{UL}+P_{perch\_sent}-P_{perch\_meas}$$

wherein
  $P_{RACH}$ is transmit power for the connection request message calculated by the on-board unit;
  $C_{RACH}$ is a constant depending on rate, channel coding, and carrier bandwidth;
  $I_{UL}$ is uplink interference determined at the telecommunications network;
  $P_{perch\_sent}$ is downlink output power used for a broadcast channel;

$P_{perch\_meas}$ is received broadcast channel power measured at the user equipment unit;

$(E_b/I_0)_{ADAPTED\ TARGET}$ is an adaptive target $E_b/I_0$ for the connection request message.

35. The method of claim 30, further comprising obtaining the actual ratio of received energy to interference as determined by the telecommunications network from an access grant message transmitted by the telecommunications network.

36. A mobile user equipment unit having an on-board unit which makes a calculation of a transmit power for a connection request message to a telecommunications network using a set of differentials, each of the differentials being a difference between a target ratio of received energy to interference and an actual ratio of received energy to interference as determined by the telecommunications network.

37. The apparatus of claim 36, wherein the on board unit comprises a memory, and wherein the on-board unit uses a mean value of the differentials stored in the memory in making the calculation of the transmit power to be used in making the connection request message to a telecommunications network.

38. The apparatus of claim 37, wherein the memory is a FIFO register.

39. The apparatus of claim 36, wherein at least one of the target ratio of received energy to interference and the actual ratio of received energy to interference as determined by the telecommunications network is transmitted from the telecommunications network to the user equipment unit.

40. The apparatus of claim 36, wherein both the target ratio of received energy to interference and the actual ratio of received energy to interference as determined by the telecommunications network is transmitted from the telecommunications network to the user equipment unit.

41. The apparatus of claim 39, wherein the actual ratio of received energy to interference as determined by the telecommunications network is transmitted from the telecommunications network to the user equipment unit in an access grant message.

42. The apparatus of claim 39, wherein the target ratio of received energy to interference as determined by the telecommunications network is transmitted from the telecommunications network to the user equipment unit in broadcast channel message.

43. The apparatus of claim 36, wherein the user equipment unit includes a memory which stores the set of differentials, and wherein the on-board unit uses the set of differentials in making the calculation of the transmit power to be used in making a connection request message to a telecommunications network.

44. The apparatus of claim 43, wherein the on-board unit uses a mean value of the differentials stored in the memory in making the calculation of the transmit power to be used in making the connection request message to a telecommunications network.

* * * * *